J. N. VALLEY.
Wooden Scoop-Shovels.

No. 148,154.  Patented March 3, 1874.

WITNESSES:  INVENTOR:
  J. N. Valley
BY
ATTORNEYS.

AM. PHOTO-LITHOGRAPHIC CO. N.Y. (OSBORNE'S PROCESS.)

UNITED STATES PATENT OFFICE.

JOHN N. VALLEY, OF NORTH EAST, PENNSYLVANIA.

IMPROVEMENT IN WOODEN SCOOP-SHOVELS.

Specification forming part of Letters Patent No. 148,154, dated March 3, 1874; application filed November 1, 1873.

*To all whom it may concern:*

Be it known that I, JOHN N. VALLEY, of North East, in the county of Erie and State of Pennsylvania, have invented a new and Improved Wooden Scoop-Shovel; and I do hereby declare that the following is a full, clear, and exact description of the same, reference being had to the accompanying drawing, forming a part of this specification.

My invention consists of a wooden scoop-shovel whereof the bowl is composed of a bottom and two sides, of thin, light boards of tough wood, and a triangular stiffening-block or head-piece, to which and the bottom a socket for the handle is secured by an angle-iron, the bottom being in concave form in the direction of its length and the sides flaring outwardly.

Figure 1:
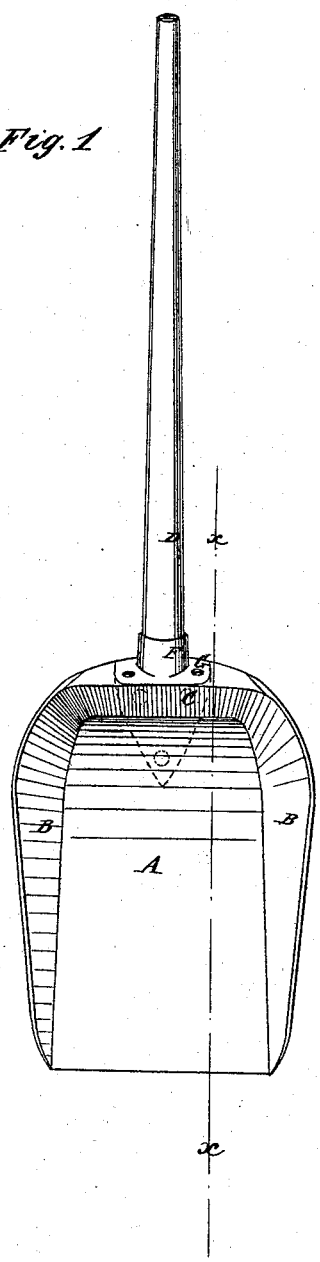
Figure 2:
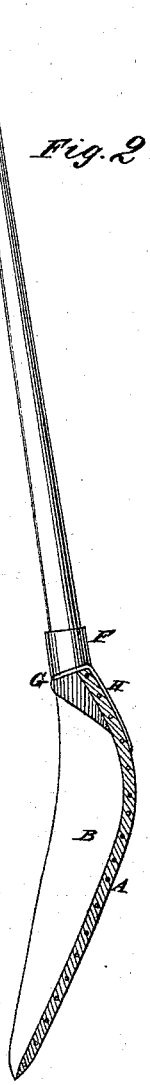

In the drawing, Figure 1 is a top or plan view of my invention, and Fig. 2 is a longitudinal section on the line $x\ x$ of Fig. 1.

A represents the bottom of the shovel, made of a piece of thin and light, but tough, wood, bent into the form shown in Fig. 1; and B B are the sides of the same, of similar material, cut and bent into the form shown. These sides are attached by nails to the side edges of the bottom, they being first undercut so as to cause the sides to flare outwardly. At the back end of the shovel is a triangular stiffening-block, C, which is attached to the bottom A, and has attached to it the extremities of the sides B B, the said block on the inside forming a smooth continuation of the sides B B. F is a handle-socket, provided with an angle, G, which is attached to the stiffening-block and bottom, and thereby serves the double purpose of a strengthening-plate for the shovel and a firm fastening for the handle.

What I claim is—

A wooden scoop-shovel composed of the bottom A, bent into the form shown, and having attached to its side edges, by nails, the outwardly-flaring sides B B, and to its back edge the triangular stiffening-block C, the latter forming on the inside a smooth continuation of the sides B B, and having attached to it and the bottom the angle-plate and handle-socket G H F, the whole constructed and combined as and for the purpose specified.

JOHN NAPOLEON VALLEY.

Witnesses:
Z. M. RING,
C. A. HITCHCOCK.